United States Patent [19]
Hakansson

[11] 3,810,634
[45] May 14, 1974

[54] RECIPROCATING ROD SEALING MEANS FOR HOT GAS ENGINES

[75] Inventor: Sven Anders Samuel Hakansson, Karolingatan, Sweden

[73] Assignee: Kommanditbolaget United Stirling (Sweden) AB & Co., Malmo, Sweden

[22] Filed: Aug. 29, 1972

[21] Appl. No.: 284,469

[30] Foreign Application Priority Data
Sept. 3, 1971 Great Britain .................. 41151/71

[52] U.S. Cl. ........................... 277/3, 92/86, 277/15
[51] Int. Cl. ............................................ F16j 15/56
[58] Field of Search ........... 92/80, 82, 86; 277/3, 15

[56] References Cited
UNITED STATES PATENTS
3,293,994  12/1966  Napolitano ............................ 92/82

*Primary Examiner*—Louis R. Prince
*Assistant Examiner*—Robert I. Smith
*Attorney, Agent, or Firm*—Laurence R. Brown, Esq.

[57] ABSTRACT

In a hot gas engine of the Stirling type, a reciprocating piston rod is sealed by means of two stationary sealing glands spaced apart and a movable sealing gland in the space between the two stationary glands. A pressure chamber is provided on each side of the movable sealing gland with a pressure respectively in each pressure chamber on opposite sides of the fixed sealing glands, corresponding in magnitude to an operating pressure in one of the engine chambers.

7 Claims, 1 Drawing Figure

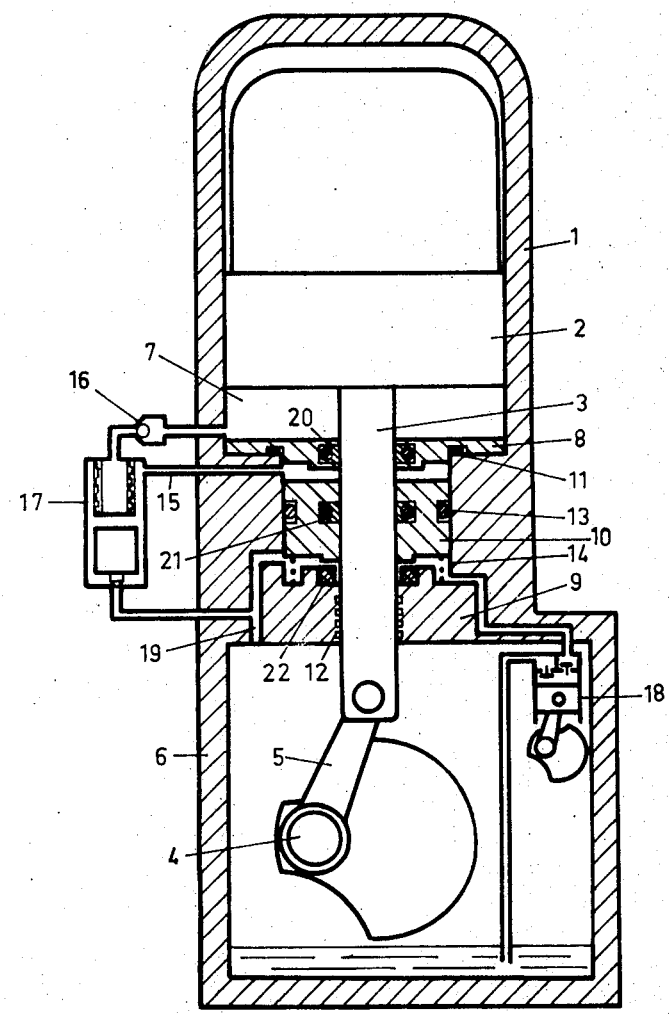

RECIPROCATING ROD SEALING MEANS FOR HOT GAS ENGINES

This invention relates to a sealing device of the kind (hereinafter called "the kind defined") employed for preventing or limiting leakages of fluid between an axially reciprocating rod and a multi-part wall through which the rod extends, the said multi-part wall being located between and serving to separate spaces containing fluid at substantially different pressures.

The present invention is intended to provide an improved sealing device of the kind defined able to withstand very high differences in the said pressures and able to remain effective during long intervals even when high linear speeds of the reciprocating rod occur.

According to the present invention there is provided a sealing device of the kind defined herein, characterized in that said multi-part wall comprises three wall parts through which the rod extends and which are spaced in the axial direction of the rod, the first wall part being stationary in the axial direction of the rod and adjacent to the high pressure side of the sealing device, the second wall part being located at a constant axial distance from said first wall part and adjacent to the low pressure side of the sealing device, the third wall part being movable in the axial direction of the rod and located between said first and second wall parts, means being provided for establishing in a first space between said first and third wall parts a substantially constant pressure corresponding substantially to a minimum pressure occurring at the high pressure side of the multi-part wall, and means being provided for establishing in a second space between said third and second wall parts a pressure substantially equal in magnitude to the pressure in the said first space.

The scope of the monopoly sought is defined in the claims hereinafter, and how the invention may be put into practice is described in more detail with reference to the accompanying drawing, showing schematically and in axial section a sealing device according to the invention as applied to a piston rod of a hot gas engine.

The drawing shows a hot gas engine cylinder 1 with a reciprocable piston 2 therein. The piston 2 is provided with a piston rod 3 connected to a crank-shaft 4 through a connecting rod 5.

The crank-shaft 4 is journalled in a crank casing 6. The interior of the crank casing 6 contains gaseous medium at a pressure which is of the same order as the ambient atmospheric pressure and is much lower than the pressure of a working gas in a chamber 7 located under the piston 2.

The chamber 7 is separated from the interior of the crank casing 6 by a multi-part wall comprising three wall parts 8, 9 and 10. The first wall part 8 is held stationary in the axial direction of the rod 3 but can make small radial movements in the direction relative to the cylinder 1, an O-ring 11 being clamped between radially extending surfaces of the wall part 8 and the cylinder 1.

The second wall part 9 is rigidly connected to the crank casing 6 and the cylinder wall 1 and is thus located at a constant axial distance from the first wall part 8. A labyrinth seal 12 is arranged in the wall part 9 in the opening for the piston rod 3.

The third wall part 10 is arranged to be movable in the axial direction of the rod 3 between the first wall part 8 and second wall part 9. An O-ring 13 is mounted between the third wall part 10 and a cylindrical boundary surface 14 surrounding it. A conduit 15 connecting a non-return valve 16 and an oil-separating device 17 connects the chamber 7 with the space between the wall parts 8 and 10 so that the pressure in the space between the wall parts 8 and 10 will correspond substantially to the minimum pressure occurring in the chamber 7 during operation of the device.

An oil pump 18 mounted in the crank casing 6 delivers oil from an oil sump to the space between the wall parts 9 and 10. Thus the oil pressure in the last-mentioned space will move the wall part 10 upwards until the inlet opening of an oil escape passage 19 is uncovered so that oil may return from the last-mentioned space to the sump through the passage 19.

A gland 20 mounted in the wall part 8 provides a seal in contact with the piston rod 3. Likewise a gland 21 arranged in the wall part 10 provides a further seal in contact with the piston rod 3. A rubber gasket 22 surrounds the piston rod 3 with small radial spacing therefrom. The rubber gasket 22 rests upon the wall part 9.

The inlet end of the oil passage 19 is closed by the wall part 10 unless the latter is raised, and the wall part 10 has an annular protuberance to engage and compress the rubber gasket 22 when the engine is not running, as further explained below.

The device described will operate as follows:

During operation of the engine the pressure varies and a minimum pressure occurs cyclically in the chamber 7, and a substantially constant pressure corresponding substantially to the said minimum pressure will be established in the space between the wall parts 8 and 10. The pressure in the space between the wall parts 8 and 10 arises by leakage of gas past the gland 20 and compression of this gas by the wall part 10 being forced upwardly by oil under pressure from the pump 18. The pressure in the space between the wall parts 8 and 10 is substantially constant although dependent upon various factors including the volumes of this space and the conduit 15 and the oil separator 17, the efficiency of the gland 20, the engine speed, the friction due to the O-ring 13 and gland 21, and inertia of the wall part 10. The oil separator 17 includes valve means to prevent gas flowing from the conduit 15 to the passage 19. Due to a mean difference in pressure across the wall part 8 some gas may leak past the seal provided by the gland 20. However, such gas will be returned automatically through the conduit 15 and valve 16.

The oil pump 18 will deliver oil to the space between the wall parts 9 and 10, and as soon as the force on the movable wall part 10 is greater on the lower side of said wall part an upward movement of the movable wall part 10 will commence. However, such upwards movement will be stopped as soon as there is sufficiently rapid leakage of oil through the passage 19. Consequently the wall part 10 will remain almost stationary during steady operation of the engine and there will be almost no difference in pressure across said wall part 10. Therefore the gland 21 will be very effective as a seal, almost completely preventing leakage of gas through the opening in the wall part 10 for the piston rod 3.

As soon as the engine is stopped oil is no longer pumped by the pump 18, and oil from the space between the wall parts 10 and 11 may leak to the sump through the labyrinth seal 12.

The wall part 10 will be pressed downwards by the gas pressure prevailing on its upper side and thus the rubber gasket 22 will become compressed between the wall parts 9 and 10 and the piston rod 3. Therefore, no gas can escape when the engine is stopped as the O-ring 13 and the rubber gasket 22 form very efficient seals.

What is claimed is:

1. A sealing device for a rod reciprocating in a hot gas engine between and extending into a first high pressure chamber and a second lower pressure chamber each having therein a different operating pressure when the engine is working, comprising in combination, three wall parts through which the rod extends spaced in the axial direction of the rod and each having a seal in contact with said rod, the first wall part being stationary in the axial direction of the rod and adjacent to said first chamber, the second wall part being located at a constant axial distance from the first wall part and adjacent said second chamber thereby forming a space between the first and second wall parts, the third wall part being located in said space and being movable in the axial direction of the rod and having a portion of said space on either side thereof adjacent the first and second wall parts respectively, means establishing in first of said portions between the first and third walls a substantially constant pressure corresponding to a minimum pressure occurring at the high pressure side of the first wall, and means for establishing in the second of said portions between the second and third walls a pressure substantially equal in magnitude to the pressure in the first of said portions.

2. A device as defined in claim 1 including an elastically deformable gasket mounted about said rod in said second portion of said space in such configuration to receive said third wall part in mating engagement to compress it against said rod as a sealing member when the pressure in said first portion of said space exceeds the pressure in said second portion of said space.

3. A device as defined in claim 1 wherein said last mentioned means comprises a pump for continuously pumping fluid into said second portion of said space and a passage for escape of said fluid being controlled by the axial position of said third wall part when moved under opposing forces from the pressures in the first and second portions of said space.

4. A device as defined in claim 1 wherein said means for establishing a pressure in said first portion of said space comprises a conduit with a non-return valve connecting said first portion of said space to said first high pressure chamber.

5. A device as defined in claim 1 wherein the first wall part and the third wall part are provided with a sealing gland contacting said rod.

6. A device as defined in claim 1 wherein the second wall part is provided with a labyrinth seal to restrict the flow of fluid between the rod and the second wall part.

7. A device as defined in claim 1 including structure permitting the first said wall part to move normally to the axis of said rod.

* * * * *